United States Patent
Tanaya (10) Patent No.: US 6,848,296 B2
(45) Date of Patent: Feb. 1, 2005

(54) MISFIRE DETECTION APPARATUS FOR INTERNAL COMBUSTION ENGINE

(75) Inventor: Kimihiko Tanaya, Tokyo (JP)

(73) Assignee: Mitsubishi Denki Kabushiki Kaisa, Tokyo (JP)

( * ) Notice: Subject to any disclaimer, the term of this patent is extended or adjusted under 35 U.S.C. 154(b) by 98 days.

(21) Appl. No.: 10/253,433

(22) Filed: Sep. 25, 2002

(65) Prior Publication Data

US 2003/0200789 A1 Oct. 30, 2003

(30) Foreign Application Priority Data

Apr. 26, 2002 (JP) ........................................ 2002-125959

(51) Int. Cl.$^7$ ............................................. G01M 15/00
(52) U.S. Cl. ................................... 73/35.08; 73/117.3
(58) Field of Search ............................. 73/35.03–35.05, 73/35.08, 117.3; 123/406.37, 406.38, 406.39, 406.29; 701/102–103, 111, 114–115

(56) References Cited

U.S. PATENT DOCUMENTS 5,836,285 A * 11/1998 Aoki et al. ............ 123/406.37
6,378,494 B1 * 4/2002 Hatazawa et al. ..... 123/406.39
2003/0200023 A1 * 10/2003 Matsushita et al. ......... 701/114
2003/0217587 A1 * 11/2003 Inada et al. ................ 73/35.08

FOREIGN PATENT DOCUMENTS

JP          2001-90647 A      4/2001

* cited by examiner

Primary Examiner—Helen Kwok
(74) Attorney, Agent, or Firm—Sughrue Mion, PLLC (57) ABSTRACT

A misfire detection apparatus for an internal combustion engine is capable of detecting combustion when an ionic current generated upon combustion is superimposed on a leakage current, even if the ionic current does not contain an increased component. An ionic current detection part (1) detects an ionic current flowing between electrodes arranged in a combustion chamber of the internal combustion engine through ions generated upon combustion of an air fuel mixture therein by impressing a voltage on the electrodes. A tendency recognition part (4–7) recognizes a tendency of a change in the ionic current detected by the ionic current detection part. A threshold determination device (8) sets a threshold for an output of the tendency recognition part. A determination device (10) determines an occurrence of combustion or misfiring in the combustion chamber based on an output of the tendency recognition part and an output of the threshold determination device.

11 Claims, 9 Drawing Sheets

(a) IONIC CURRENT (COMBUSTION DURING OCCURRENCE OF LEAKAGE CURRENT)

(b) IONIC CURRENT (AFTER MASK CIRCUIT)

(c) AFTER DERIVATIVE CALCULATION DEVICE (d) AFTER SMOOTHING DEVICE TENDENCY OF SLOPE OF IONIC CURRENT AND PEAK HOLD THRESHOLD (HOLDING PEAK IN A DIRECTION OF AN ARROW)

(e) OUTPUT (LOW ACTIVE) BELOW PEAK HOLD THRESHOLD (f) AFTER SMOOTHING DEVICE TENDENCY OF SLOPE OF IONIC CURRENT AND BOTTOM HOLD THRESHOLD (HOLDING BOTTOM IN A DIRECTION OF AN ARROW)

(g) OUTPUT (LOW ACTIVE) ABOVE BOTTOM HOLD THRESHOLD

MISFIRE DETECTION APPARATUS FOR INTERNAL COMBUSTION ENGINE

BACKGROUND OF THE INVENTION

1. Field of the Invention

The present invention relates to a misfire detection apparatus for an internal combustion engine capable of detecting combustion or misfiring by detecting a change in the amount of ions generated by combustion of an air fuel mixture in the internal combustion engine.

2. Description of the Related Art

It is generally known that ions are generated when an air fuel mixture is burnt or combusted in cylinders of an internal combustion engine. Thus, the ions thus generated can be detected and observed as an ionic current by means of a probe which is installed in each of the cylinders and on which a high voltage is impressed as a bias voltage. That is, the occurrence of combustion or misfiring in all the cylinders can be individually detected or determined by detecting the presence or absence of such an ionic current. However, soot might sometimes adhere to the electrodes of a spark plug installed in each cylinder as a result of combustion of the air fuel mixture depending upon the operating condition of the internal combustion engine.

For instance, assuming that the bias voltage is 100 V and the insulation resistance of the spark plug adhered by soot is 5 MΩ, a leakage current of 20 μA flows. As a result, a leakage current flows into an ionic current detection part while monotonously attenuating at a prescribed time constant in accordance with the impression of an ignition pulse, as shown in the FIG. 8. In addition, after the start of discharging of an spark plug, an ionic current generated by combustion of an air fuel mixture flows while being superimposed on the leakage current that decreases monotonously and gradually according to a time constant CR which is determined by a high resistance of the sooted ignition plug and a capacitor component C of a biasing circuit.

Figure 9:
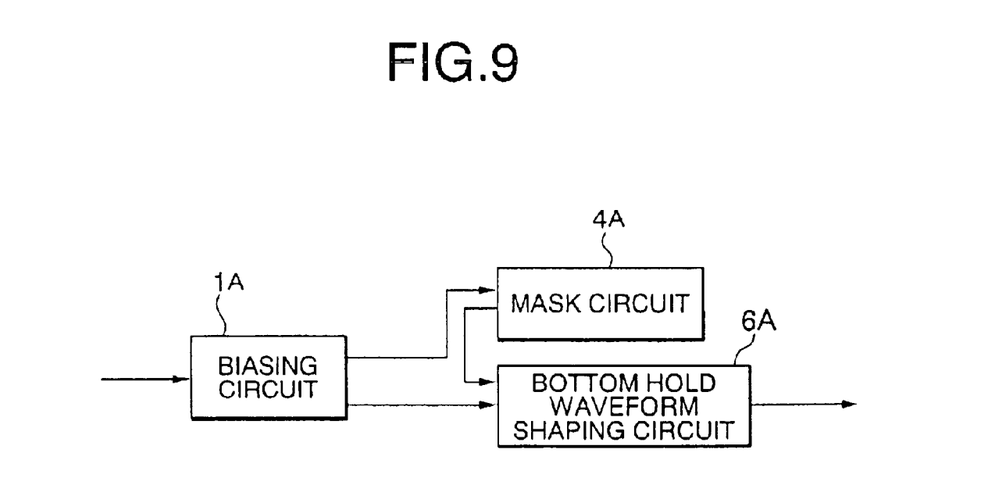
FIG. 9 is a view of the overall configuration of a known misfire detection apparatus.

FIG. 9 is a constructional view of a known misfire detection apparatus for an internal combustion engine disclosed in Japanese Patent Laid-Open No. 2001-90647. In FIG. 9, an ionic current detection part in the form of a biasing circuit 1A outputs an ionic current which is superimposed by a monotonously decreasing leakage current upon occurrence of a leakage current. A bottom level of the output from the biasing circuit 1A after being masked by a mask circuit 4A is maintained as a bottom hold value, based on which a threshold for ionic current determination is set. A waveform shaping circuit (hereinafter referred to as a bottom hold waveform shaping circuit) 6A performs waveform shaping in accordance with the bottom hold value, and makes a comparison between the level of the ionic current input from the biasing circuit 1A after the lapse of a predetermined mask time and the threshold so as output a combustion pulse.

Next, the operation of the above-mentioned known misfire detection apparatus will be described while referring to FIG. 10(A) through FIG. 10(D). When an ignition pulse $I_B$ (see FIG. 10(A)) is impressed, a leakage current flows into the ionic current detection part in the form of the biasing circuit 1A while monotonously attenuating at a prescribed time constant. The ionic current (see FIG. 10(B)) detected by the biasing circuit 1A is input to the mask circuit 4A where it is waveform shaped at a fixed threshold to form a pulse which is then cut for a predetermined period of time to provide a mask signal. A bottom value after removal of the masking is maintained as a bottom hold value, based on which a threshold for ionic current determination is set (see FIG. 10(C)).

The ionic current output from the biasing circuit 1A is input to the bottom hold value waveform shaping circuit 6A, where it is compared with the bottom level of the ionic current after removal of the masking. When the level of the ionic current exceeds the threshold, the bottom hold value waveform shaping circuit 6A outputs a combustion pulse. As a result, combustion in an explosion cylinder can be detected irrespective of the magnitude of the leakage current by waveform shaping the ionic current superimposed on the leakage current into the combustion pulse to be output (see FIG. 10(D)).

Figure 8:
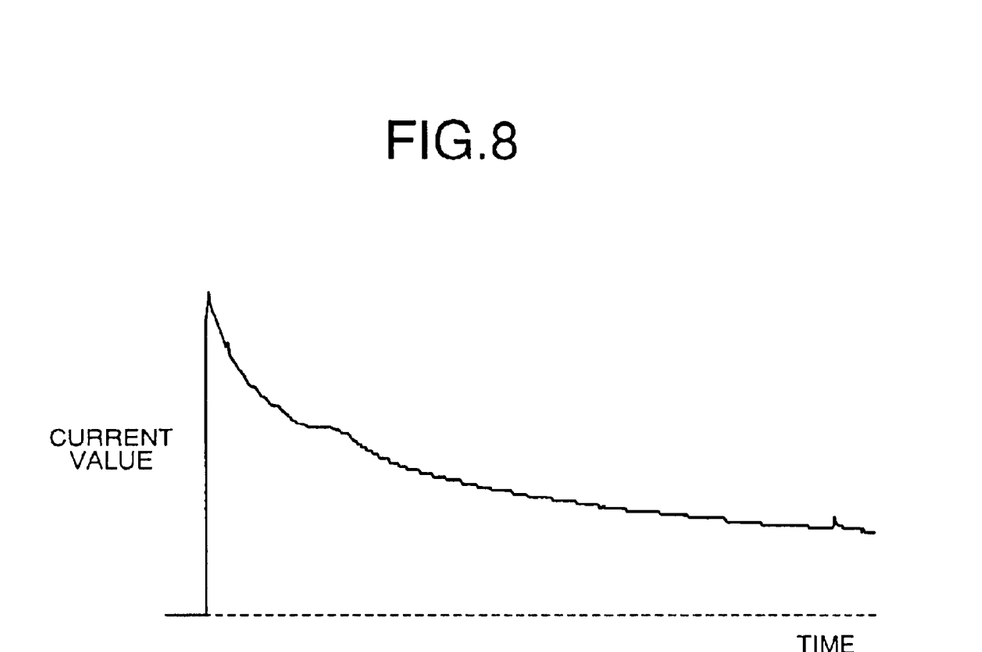
FIG. 8 is an example of the waveform of an ionic current which is superimposed on a leakage current and which contains no bottom.

However, in the known misfire detection apparatus as described above, there might be sometimes generated an ionic current due to combustion which is superimposed on a leakage current and which does not exceed the bottom hold value, depending upon a certain operating condition of the internal combustion engine, as shown in FIG. 8.

Figure 10:
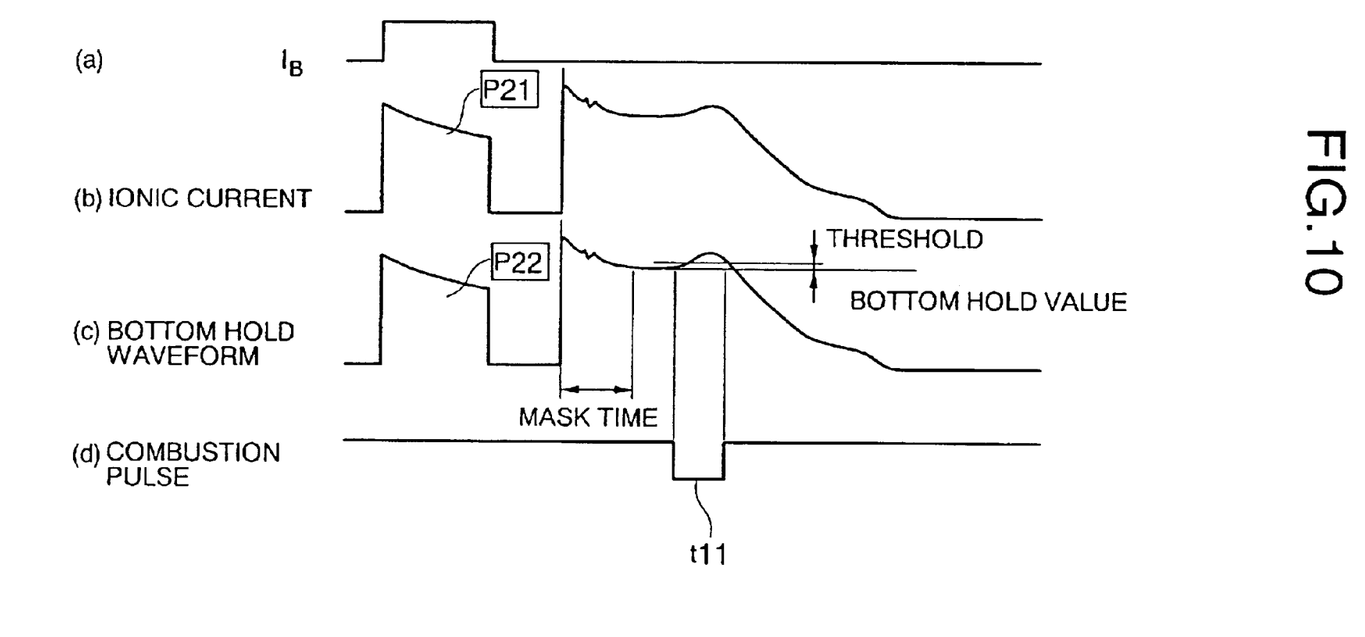

It is impossible to determine the occurrence of combustion based on the bottom hold threshold if there is no range in which an ionic current increases, as indicated by t11 in FIG. 10(D). In this case, there arises a problem that the occurrence of combustion is unable to be detected and hence is mis-detected as a misfire.

SUMMARY OF THE INVENTION

The present invention is intended to obviate the above-mentioned problem, and has for its object to provide a misfire detection apparatus for an internal combustion engine which is capable of detecting an occurrence of combustion even if an increased component is not contained in an ionic current accompanying the combustion when the ionic current is superimposed on a leakage current.

Bearing the above object in mind, the present invention resides in a misfire detection apparatus for an internal combustion engine which includes an ionic current detection part in the form of a biasing device 1 or 21 for detecting an ionic current flowing between electrodes arranged in a combustion chamber of the internal combustion engine through ions generated upon combustion of an air fuel mixture therein by impressing a voltage on the electrodes. A tendency recognition part recognizes the tendency of a change in the ionic current detected by the ionic current detection part. In a preferred embodiment, the tendency recognition part is constituted by a mask device 4, a leakage determination device 5, a derivative calculation device 6, and a smoothing device 7. A threshold determination device 8 sets a threshold for an output of the tendency recognition part. A determination device 10 determines an occurrence of combustion or misfiring in the combustion chamber based on an output of the tendency recognition part and an output of the threshold determination device.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 3(A) through 3(G) are timing charts showing combustion determination processing carried out by a misfire detection part in the misfire detection apparatus for an internal combustion engine according to the first embodiment of the present invention.

FIGS. 6(A) through 6(G) are timing charts showing combustion determination processing carried out by a misfire detection part used in the misfire detection apparatus for an internal combustion engine according to the third embodiment of the present invention.

FIGS. 10(A) through 10(D) are timing charts in the known misfire detection apparatus.

DESCRIPTION OF THE PREFERRED EMBODIMENTS

Now, preferred embodiments of the present invention will be described below while referring to the accompanying drawings.

First of all, reference will be made to how to detect an occurrence of combustion or misfiring in an internal combustion engine by using an ionic current according to the present invention. It is known that ions and electrons generated upon combustion of an air fuel mixture in an engine cylinder can be detected as a current by impressing a bias voltage thereon in the cylinder. At this time, when combustion has not taken place, no current is detected except for ignition noise, external noise, or noise generated immediately after or at the moment when a bias voltage is applied in the cylinder, alternatively, a monotonously decreasing leakage current is detected.

When combustion has taken place, an ionic current generated upon combustion repeats a series of cycles of increasing and thereafter decreasing several times. Concretely, cycles generated during normal combustion are a cycle according to combustion chemical changes and a cycle according to pressure and temperature changes. Other than these, there might be generated an ionic current increasing cycle according to residual gases in the cylinder.

In view of such circumstances, the present invention is intended to detect an occurrence of combustion or misfiring in a cylinder in a reliable manner even when a leakage current is generated, by applying a peak hold threshold to a value representative of a slope or gradient of an ionic current generated upon combustion of an air fuel mixture when a change in the slope or gradient of the ionic current accompanying the combustion is detected during generation of the leakage current.

Embodiment 1.

Figure 1:
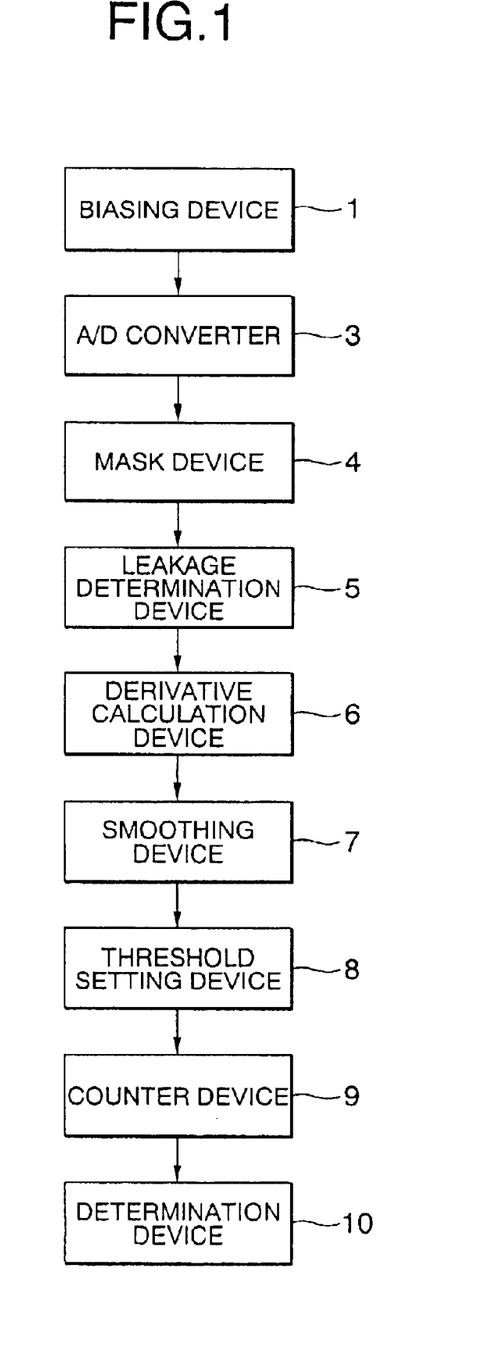
FIG. 1 is a functional block diagram schematically showing a misfire detection apparatus for an internal combustion engine according to a first embodiment of the present invention.
Figure 2:
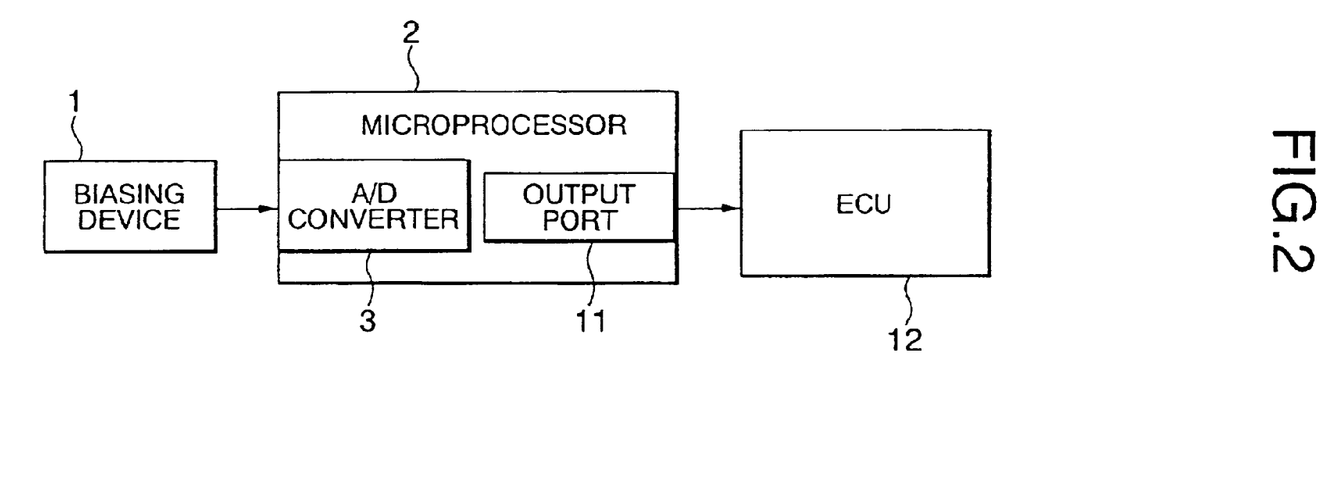
FIG. 2 is a schematic view showing the hardware configuration of the misfire detection apparatus for an internal combustion engine associated with the first embodiment and a second embodiment of the present invention.

Hereinafter, a first embodiment of the present invention will be explained with reference to the accompanying drawings. FIG. 1 and FIG. 2 are a functional block diagram and a hardware configuration view, respectively, of a misfire detection apparatus for an internal combustion engine according to the first embodiment. In these figures, when a leakage current is generated, an ionic current detection part in the form of a biasing circuit 1 according to this first embodiment outputs an ionic current superimposed on the monotonously decreasing leakage current. The ionic current output from the biasing circuit 1 is converted from analog data into digital data by means of an analog to digital (A/D) converter 3 to be input to a microprocessor or microcomputer 2.

In the microprocessor 2, noise generated upon impression of an bias voltage is masked from the input data by means of a mask device 4. When a leakage determination device 5 determines that there takes place a leakage current, a derivative calculation device 6 calculates an amount of change b(n) in each piece of data, and a data smoothing device 7 calculates an average value c(n) of several consecutive data change amounts b(n) calculated by the derivative calculation device 6, and extracts a tendency of the data changes. That is, the mask device 4, the leakage determination device 5, the derivative calculation device 6 and the data smoothing device 7 together constitute a tendency recognition part for recognizing the tendency of a change in the ionic current. A threshold determination device in the form of a threshold setting device 8 maintains a peak in the tendency or average value c(n) of the data changes and sets a peak hold threshold PH. When the tendency c(n) of the data changes consecutively becomes lower than the peak hold threshold PH a prescribed number of times or more, or when the tendency c(n) cumulatively becomes lower than the peak hold threshold PH a prescribed number of times (or a prescribed duration) or more within a prescribed period of time, a counter device 9 and a determination device 10 output combustion pulses, respectively.

Next, particular reference will be made to the internal operation of the microprocessor 2 in the misfire detection apparatus for an internal combustion engine as constructed above by using a flow chart shown in FIGS. 3(A) through FIG. 3(G) and a timing chart shown in FIG. 4. The data (P1 in FIG. 3(A)) fetched or taken in by the microprocessor 2 is compared with a detection threshold. When the data exceeds the detection threshold, a timer is started (steps S1–S6→S1~S2 in FIG. 4). When a mask setting time P has elapsed, the data fetched by the microprocessor 2 is sequentially stored into a memory like an array a(1), a(2), a(3), ..., etc., (P2 in FIG. 3(B) and step S10 in FIG. 4). Here, note that the data that had been taken into the microprocessor 2 by the time when a mask time has elapsed from the start of the timer is not stored in the memory but disregarded.

The derivative calculation device 6 calculates the following equation by using the array data a(n) stored in the memory.

$$b(n)=a(n)-a(n-1) \tag{1}$$

Figure 3:
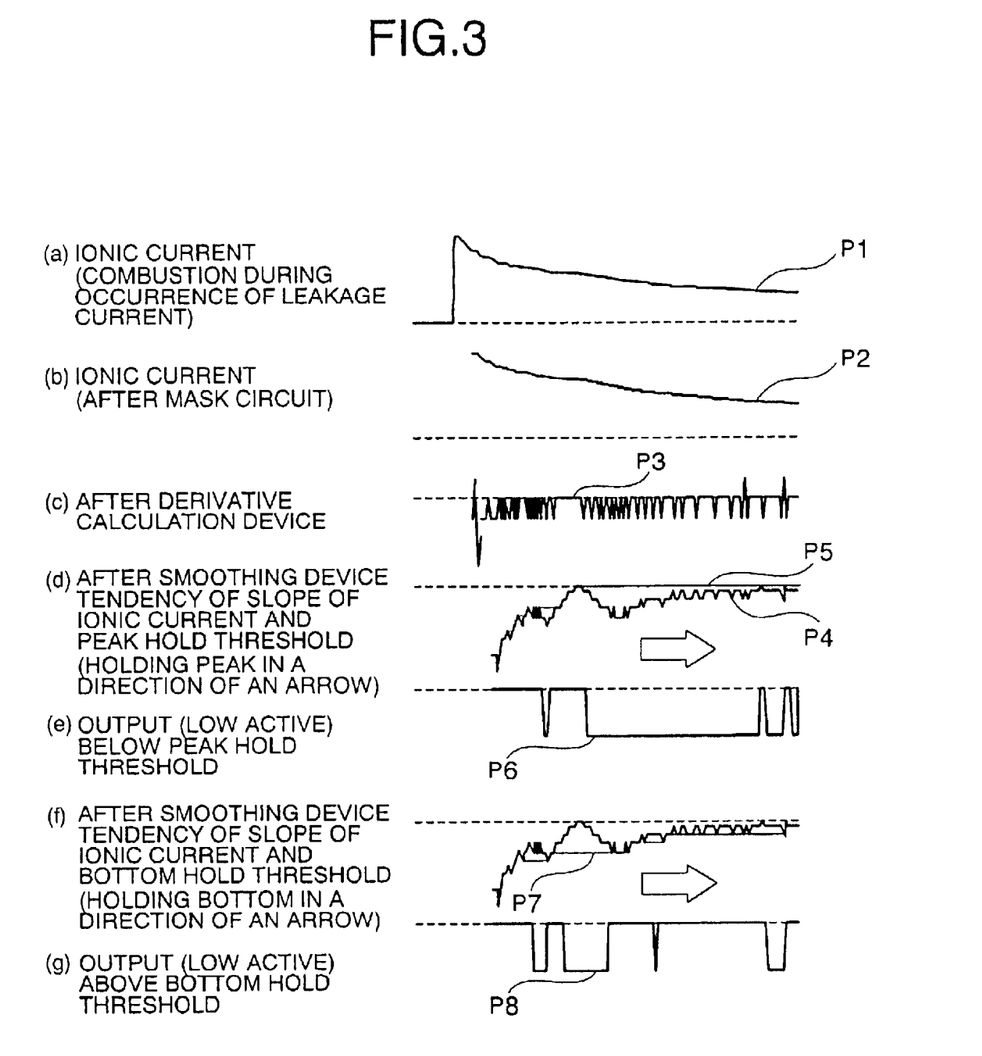
Figure 4:
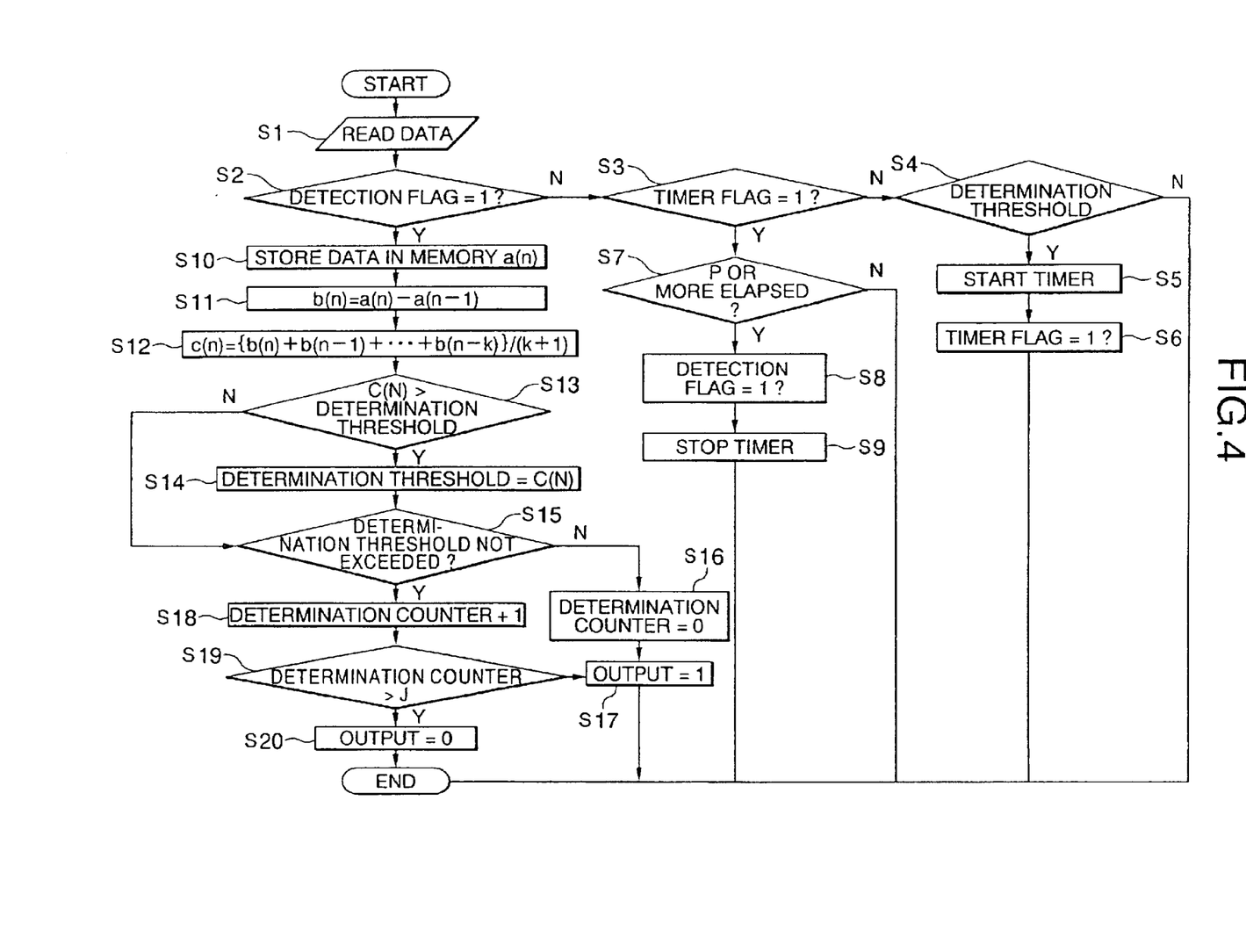
FIG. 4 is a flow chart of a combustion determination method carried out by the misfire detection part used in the misfire detection apparatus for an internal combustion engine according to the first embodiment of the present invention.

This calculation result is stored in an array b(n) (step S11 in FIG. 4). The array b(n) obtained at this time corresponds to a first derivative. That is, it represents the slope or gradient of the ionic current (P3 in FIG. 3(C)). In addition, the array b(n) is smoothed by the smoothing device 7 while using the following equation.

$$c(n)=\{(b(n)+b(n-1)+\ldots+b(n-k))\}/(k+1) \quad (2)$$

An array c(n) at this time is obtained by smoothing the first derivative. That is, it shows a tendency of the slope of the ionic current (P4 in FIG. 3(D) and step S12 in FIG. 4).

At the same time, c(0) is stored into the peak hold threshold PH as an initial value. This determination threshold PH is sequentially compared with c(1), c(2), ..., c(n), respectively, and a larger one of each pair of compared values is always stored as a peak hold threshold PH (P5 in FIG. 3(D) and steps S13–S15 in FIG. 4).

When c(n) is less than the peak hold threshold PH, the counter device 9 is started, whereas when the value of the peak hold threshold PH has been rewritten or updated, the counter value is cleared to 0 and the counter output becomes 1 (steps S15–S16 in FIG. 4). When the counter value exceeds a prescribed value J, it is determined that combustion takes place (output=0), and a combustion pulse is output from an output port 11 to an electronic control unit (ECU) 12 (P6 in FIG. 3(E) and steps S15→S18~S20 in FIG. 4).

Thus, according to the first embodiment, even if an ionic current, which is generated by the combustion of an air fuel mixture in an engine cylinder and superimposed on a leakage current, contains no increased component, it is possible to detect such combustion in a reliable manner.

Embodiment 2.

Although in the above-mentioned first embodiment, the peak hold threshold is sequentially set with respect to the tendency of the data changes in the order of fetching of the data, a bottom hold threshold may be sequentially set while going back in time (P7 in FIG. 3(E)). That is, the bottom hold threshold may be sequentially set while going back in a direction from a data fetch terminating time point to a data fetch starting time point. The output at this time is shown at P8 in FIG. 3(G), and only a convex portion of the ionic current generated due to combustion can be detected, thus improving the detection accuracy.

Embodiment 3.

In a third embodiment of the present invention, a change in the tendency or increase of the ionic current generated due to combustion is detected. Concretely, an upwardly convexed portion of an input curve is detected. Expressing this mathematically, the area where the second derivative value of the input curve becomes negative is detected.

The change in the ionic current value according to combustion that is wanted to be recognized is macroscopic. Concretely, it is a change in a range of about 500 μs—about 5 ms. However, when the ionic current is seen in a microscopic aspect, it is understood that the ionic current is always caused to repeatedly vary due to the influence of external noise or the like. Moreover, in order to actually process the data by means of a microcomputer, etc., it is necessary to convert analog data into digital data by an analog to digital (A/D) converter or the like. At this time, discretized or digitized data becomes data with steep changes.

Therefore, when a derivative of the input data, which is an amount of change of the data, is directly calculated, the resultant values thus obtained will be vary up and down in a very disorderly manner. As a result, it is difficult to detect only concaves and convexes in the ionic current generated due to combustion.

In contrast to this, in order to avoid or alleviate the influence of noise, etc., it is considered to employ a method of using data at each prescribed interval for the calculation of the derivative of the data. In this method, however, when the crest of extemporaneous noise is sampled by chance, or when the valley of noise causing an extemporaneous drop of data is sampled by chance, data might be varied in accordance with the noise.

According to the third embodiment, only the changes due to combustion can be extracted without being influenced by the variations caused by minute noise or discretization or digitization of data by sequentially calculating the average values of calculation results consecutively obtained at a plurality of points to catch the tendency of the change in these average values, i.e., the tendency of the data changes.

Figure 5:
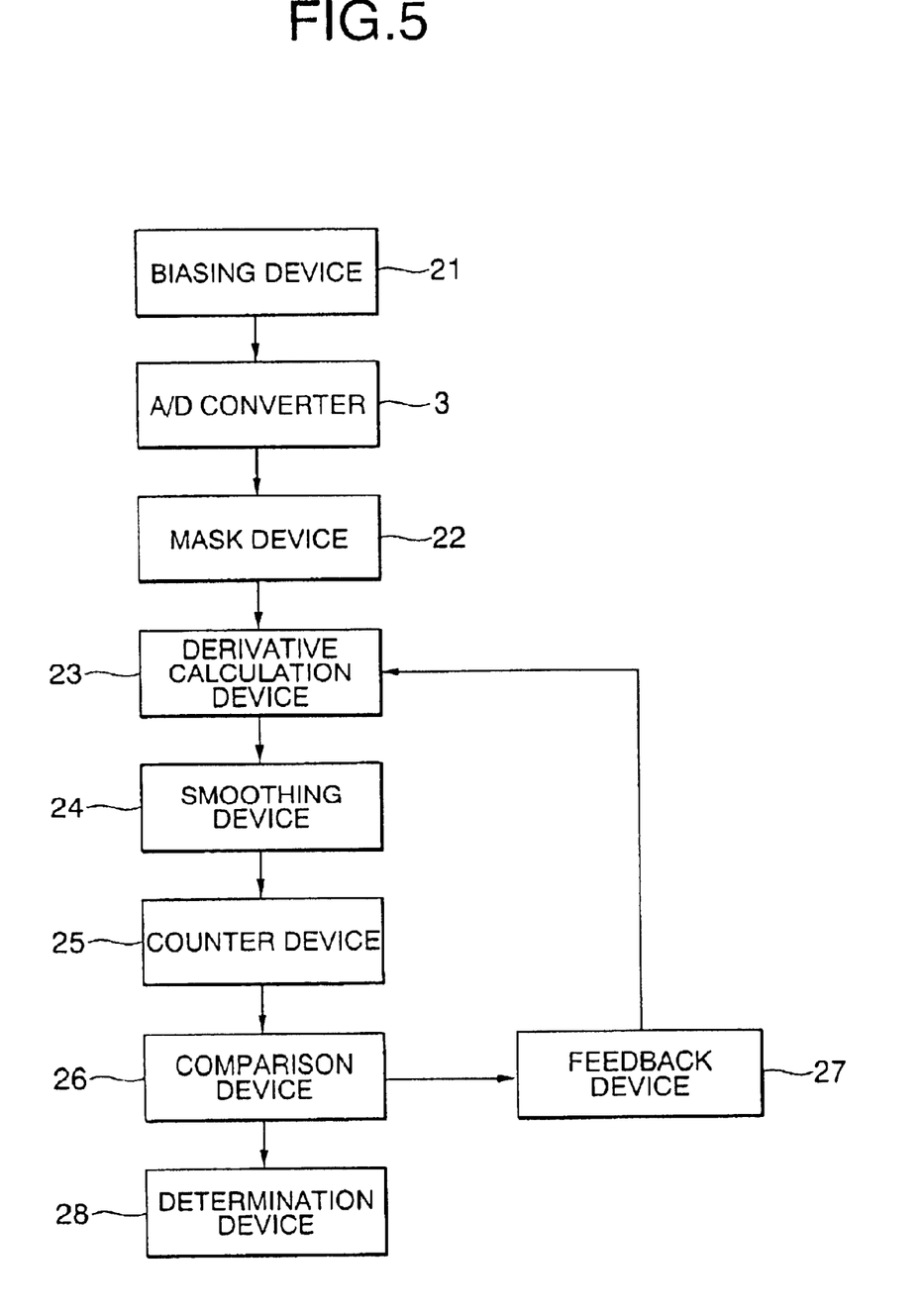
FIG. 5 is a schematic view showing a misfire detection apparatus for an internal combustion engine according to a third embodiment of the present invention.

Hereinafter, the third embodiment of the present invention will be explained while referring to the accompanying drawings. FIG. 2 and FIG. 5 are a hardware configuration view and a functional block diagram, respectively, of a misfire detection apparatus for an internal combustion engine according to this third embodiment. In these figures, the operation of this embodiment until data is input to the microprocessor 2 is similar to that of the first embodiment.

In the microprocessor 2, noise generated upon application of a bias voltage and contained in the input data is masked by a mask device 22, and an amount of change b(n) in each piece of data is calculated by a derivative calculation device 23. An average value c(n) of several consecutive data amounts b(n) calculated by the derivative calculation device 23 is calculated by a data smoothing device 24, and the tendency of the change in the data is extracted. Thereafter, the count value is subtracted from the average value by a counter device 25. The count value thus obtained is compared with a comparison value by a comparison device 26. When the count value is greater than the comparison value, the output of the smoothing device 24 is again input to the derivative calculation device 23 through a feedback device 27, and this operation is repeated until the count value becomes equal to the comparison value. When the count value becomes equal to the comparison value, the output of the smoothing device 24 is input to a determination device 28 where a determination of combustion or misfiring is made. The result of this determination is output from the microprocessor 2 through the output port 11, so that the output is taken into the ECU 12.

Next, the internal operation of the microprocessor 2 in the misfire detection apparatus for an internal combustion engine as constructed above will be explained while using a flow chart and a timing chart shown in FIGS. 6(A) through 6(G) and FIG. 7, respectively. First, the data (P11 in FIG. 6(A)) fetched or taken into the microprocessor 2 is compared with the detection threshold. When the data thus input exceeds the detection threshold, the timer is started (steps S31–S36→S31 and S32 in FIG. 7). When a mask setting time P has elapsed, the data taken into the microprocessor 2 is sequentially stored in the memory like the array a(1), a(2), a(3), etc. (P12 in FIG. 6(C) and step S40 in FIG. 7). Here, note that the data that had been taken into the microprocessor 2 by the time when the mask time has elapsed from the start of the timer is not stored in the memory but disregarded.

An array data a(n) stored in the memory is used for the calculation of the following equation by the derivative calculation device 23.

$$b(n)=a(n)-a(n-1) \quad (3)$$

Figure 6:
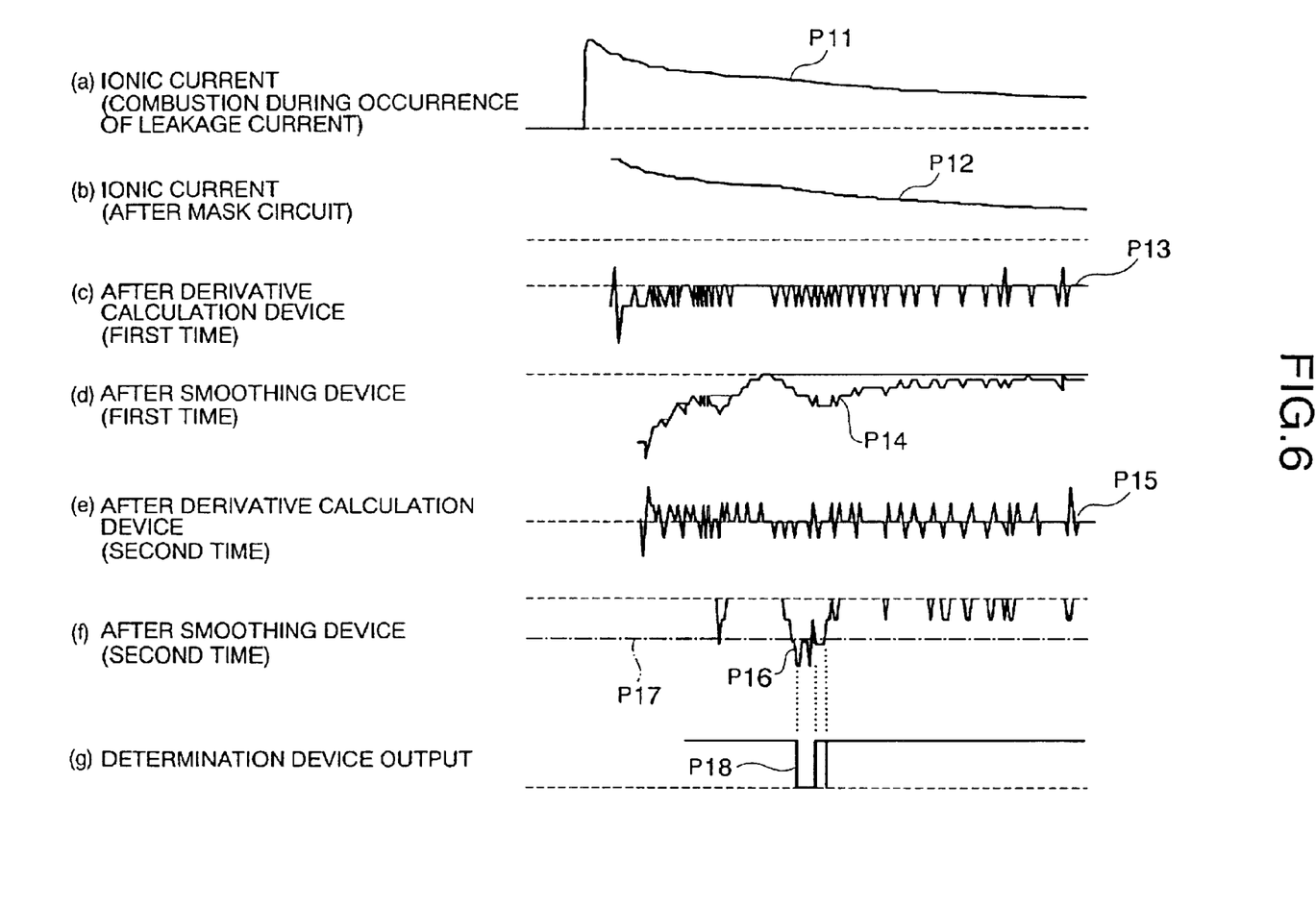
Figure 7:
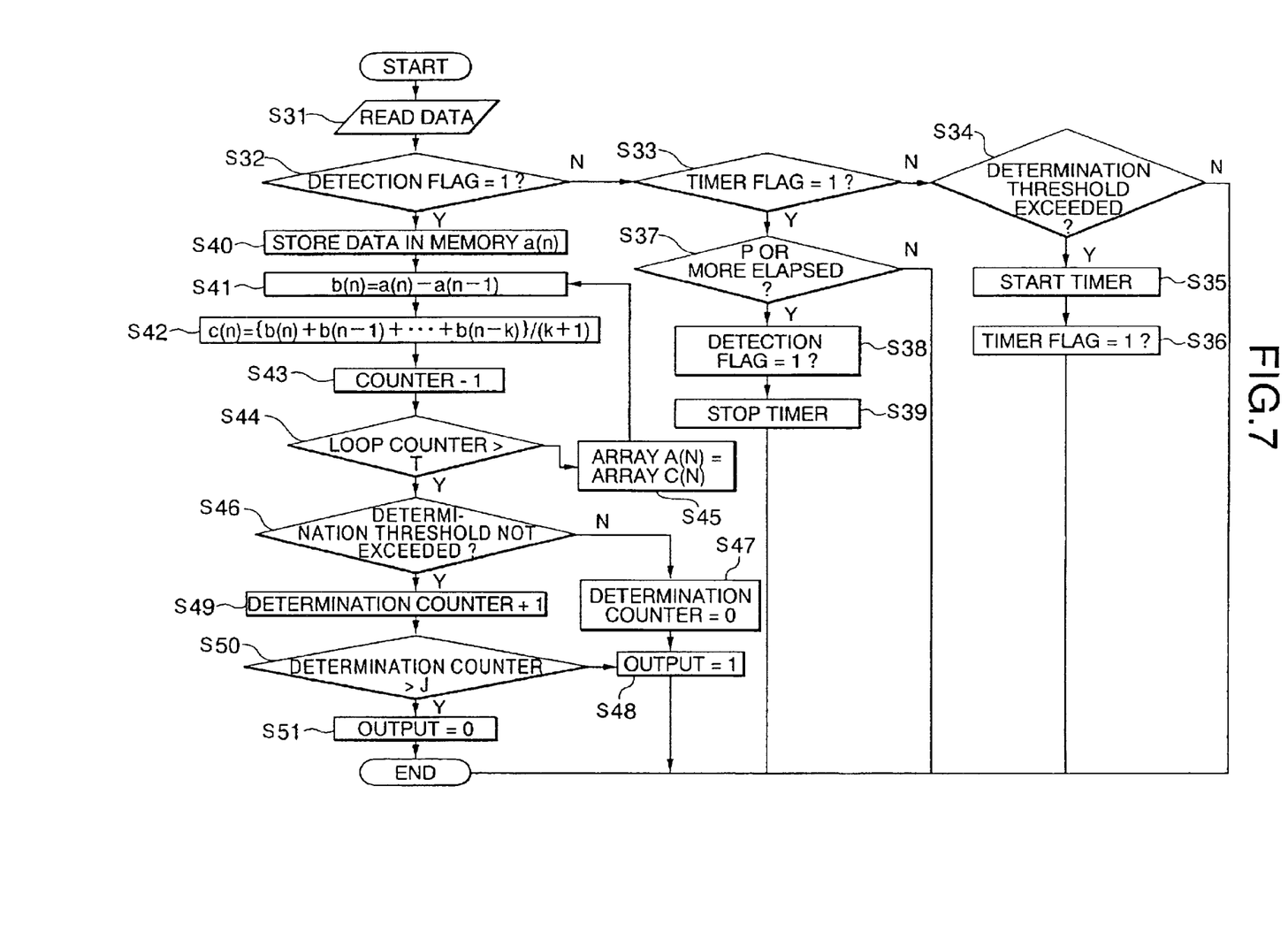
FIG. 7 is a flow chart of a combustion determination method carried out by the misfire detection part used in the misfire detection apparatus for an internal combustion engine according to the third embodiment of the present invention.

The result of his calculation is stored as an array b(n) (step S41 in FIG. 7). The array b(n) obtained at this time corresponds to a first derivative, and represents the slope or gradient of the ionic current (P13 in FIG. 6(C)). In addition, the array b(n) is smoothed by the smoothing device 24 while using the following equation.

$$c(n)=\{(b(n)+b(n-1)+\ldots b(n-k))\}/(k+1) \quad (4)$$

The array c(n) at this time is obtained by smoothing the first derivative, and it represents the tendency of the slope or gradient of the ionic current (P14 in FIG. 6(D) and step S42 in FIG. 7).

In the third embodiment, if the count value was set to 2 beforehand, by subtracting a value of 1 from the count value of the counter device 25, the count value becomes 1, which is then compared with a comparison value of 0 by the comparison device 26. Since the count value of 1 is larger than the comparison value of 0, the processing advances to the feedback device 27, where the array c(n) is copied to the array a(n). Thereafter, a return is performed to the above equation (3), and the above-mentioned processes from equation (3) to equation (4) are performed again (steps S43–S45→S41 in FIG. 7). The array b(n) obtained at this time represents a second derivative (P15 in FIG. 6(E)). The array c(n) is obtained by smoothing the second derivative, and it exhibits the tendency of the change in the concaves and convexes of the ionic current (P16 in FIG. 6(F)). The count value is subtracted by 1 to provide a new count value of 0. Accordingly, the count value does not exceed the comparison value of 0, so the flow exits from the feedback loop (steps S44→S46 in FIG. 7).

Subsequently, in order to detect the ionic current generated upon combustion, an upwardly convexed ionic current is detected by the determination device 28. When the array c(n), which means a second derivative, takes a negative value, the ionic current will have an upwardly convexed change. Therefore, when the values less than a prescribed negative threshold Th (P17 in FIG. 6(F)) continue to exist consecutively in an array c(n) more than a prescribed number of times (case (1)), or when its negative area is less than a prescribed value (case (2)), or when both of the above cases (1) and (2) are satisfied (case (3)), a determination of combustion is made. As a result, a combustion pulse is output from the output port 11 to the ECU 12 (P18 in FIG. 6(G) and steps S46–S51 in FIG. 7).

Thus, according to the third embodiment, it is possible to detect combustion or misfiring with high accuracy.

Embodiment 4.

In the above-mentioned respective first through third embodiments, for instance, c(n) described in the first embodiment may be replaced with -c(n), and in this case, the method of setting a threshold is changed from a peak hold method to a bottom hold method, so that when c(n) exceeds the threshold set in this manner, a combustion pulse is generated. Thus, similar to the first through third embodiments, it is possible to make a determination of combustion by reversing the signal from positive to negative as well as the determination from a positive direction to a negative direction.

Embodiment 5.

Although in the above-mentioned first and third embodiments, a smoothing method is performed as shown in equation (2) and equation (4), data may be smoothed by a method of calculating a moving average by the use of the following equation.

$$c(n)=m \times c(n-1)+(1-m) \times b(n)$$

Embodiment 6.

Although in the first embodiment and third embodiments, the microprocessor or microcomputer 2 is used for the operational processing, a logic IC such as a digital signal processor or a gate-array circuit may be employed for this purpose in place of the microprocessor or microcomputer 2.

Embodiment 7.

Although in the first embodiment and third embodiments, a timer is used in the mask device 4 or the mask device 22 to recognize the lapse of a prescribed time for masking a signal, the lapse of the mask time may be determined by the lapse of a prescribed count number by using a counter in place of the timer.

Embodiment 8.

Although in the first and third embodiments, the signal is processed in the order from the derivative device toward the smoothing device, the same results will be obtained even if this order may be reversed, that is, the signal may be processed in the order from the smoothing device to the derivative device.

Embodiment 9.

In the first embodiment, a threshold is set by holding a peak value for the tendency P4 of the slope or gradient of the ionic current at all times, as shown at P5 in FIG. 3(D), thereby detecting combustion or misfiring. This method is advantageous in that the calculation load is light and calculation processing can be performed at high speed. Accordingly, when a determination of combustion or misfiring is to be simply made, this method is advantageous, but when detectability of only a current component based on combustion is poor, for instance in the case where the current value keeps decreasing monotonously after a peak due to combustion as shown at P1 in FIG. 3(A), it might sometimes be determined that the entire current after the peak due to combustion represents a combustion range. In contrast to this, detectability of the combustion current component alone can be improved by decreasing the threshold at a prescribed amount of attenuation without continuing to hold a peak value as the threshold after detection of the peak value with respect to the tendency P4 of the slope of the ionic current (see FIG. 3(D)).

Concretely, the threshold is attenuated by the following technique. The processes until the numerical row or array c(n) representing the tendency of the slope of an ionic current is obtained are similar to those of the first embodiment. An initial value of c(0) in the initial stage of the value c(n) representing the tendency of the slope of the ionic current after having been masked by the mask device may be used as an initial value of the threshold. Also, an arbitrary value of c(n) within a prescribed number of times after having been masked by the mask device may be used as an initial value of the threshold, or such an initial value may be given by a value equal to or more than the value representing the greatest slope which can be taken as a negative slope.

Data freshly input is compared with the threshold determined up to now, and the greater one of them is stored as a new threshold in the memory. At this time, the threshold is not immediately updated by the new data even if the new data exceeds the threshold set to now. A first counter is instead started when the new data exceeds the threshold set to now, which is held as a threshold until the first counter reaches a prescribed value. New data which is input at the time point when the first counter reaches the prescribed value or at the following time point is compared with the threshold determined to now, so that the threshold may be updated by setting the greater one of them as a new threshold, which is then stored in the memory. By so doing, it is possible to prevent an improper rise in the threshold due to noise or the like, thereby avoiding misjudgment of combustion or misfiring.

A second counter is started at the time point when the threshold is updated to the new data or at the following time point. The threshold is held until the second counter reaches a prescribed value. Alternatively, when the new data exceeds the threshold, the threshold is updated to a new value. At this time, it is required that the set value of the second counter is greater than the set value of the first counter. Even if the new data exceeds the present threshold, the update of the threshold is not performed until the set value of the first counter is reached.

After the second counter reaches the set value, the threshold is being decreased if c(n) does not still exceed the threshold. The attenuation rate is set to a value between zero and the value corresponding to the slope of c(n) from the time point when the second counter starts counting to the time point when the second counter reaches the set value. Thereafter, the set value is set while maintaining this attenuation rate until c(n) intersects the threshold thus set.

By comparing the thus set threshold with c(n), it is possible to detect the termination or trailing end of a wave or pulse of the ionic current generated by combustion with accuracy higher than that in the first embodiment. The pulse width detected for the threshold at this time is a width representing only the latter half of the wave or pulse from its peak of the ionic current. Accordingly, the entire width of the wave or pulse can be estimated by doubling the width detected with this threshold.

Embodiment 10.

Although in the ninth embodiment, the threshold is decreased based on the slope of c(n), it may be changed at a prescribed rate of change h which is preset in accordance with an engine operating condition.

Embodiment 11.

In the first embodiment or the ninth embodiment, the tendency of the threshold is held until the threshold intersects c(n), but in cases where high detection accuracy is not required but a light calculation load and a high processing speed are required, the tendency of the change of the threshold may be maintained only for a predetermined period of time set in accordance with the engine operating condition, and thereafter, the arithmetic calculation for the amount of change may be stopped, while maintaining the value of the change amount at that time, or the maintenance of the threshold or the tendency of the change of the threshold may be removed or stopped to again set the threshold to c(n) after a predetermined time set in accordance with the engine operating condition has elapsed, or the arithmetic calculation for determination of combustion or misfiring may be stopped at this time point.

Embodiment 12.

Although in the first embodiment or the ninth embodiment, the tendency of the threshold is maintained until the threshold intersects c(n), it is possible to further improve accuracy by maintaining the tendency of the threshold until the following change point of the tendency of the ionic current is reached, though the calculation load is increased as compared with the first embodiment or the ninth embodiment.

For instance, a maximum point and a minimum point of c(n) are change points of the tendency of the slope of the ionic current. Let us assume the time point, at which it is determined by the use of a counter that the threshold is maintained for a set time interval or more, to be a change point, as shown in the ninth embodiment. In this case, the tendency of the threshold is maintained after a maximum point is detected by using a peak hold until a minimum value is detected by using a bottom hold, and the tendency of the threshold is then removed or stopped to update the threshold to c(n) upon detection of the minimum value. In this manner, it becomes possible to accurately detect an endpoint of a wave or peak of the ionic current.

Embodiment 13.

It will be possible to secure further detection accuracy by applying the method of the ninth embodiment, the tenth embodiment, the eleventh embodiment or the twelfth embodiment to the method of the second embodiment, though the calculation load and speed is inferior to those of these embodiments.

Embodiment 14.

Though sensitivity in detection is reduced to more or less extent, It will also be possible to prevent misjudgments due to noise, etc., by slightly offsetting the threshold described in each of the above-mentioned first through thirteenth embodiments in a direction to lower the detection sensitivity.

As will be clear from the foregoing, the following advantages are obtained according to the present invention.

That is, when an ionic current generated upon combustion is superimposed on a leakage current, the combustion can be detected even if an increased component is not contained in the ionic current.

In addition, it becomes possible to make a determination of combustion or misfiring alone in an efficient manner.

Moreover, it also becomes possible to determine combustion or misfiring alone accurately as well as efficiently.

Further, when noise or the like is mixed into a signal, it becomes possible to accurately determine combustion or misfiring.

Furthermore, influences due to noise can be removed well.

Still further, it is possible to determine combustion or misfiring in an efficient and quick manner.

In addition, it is possible to reduce the calculation load of the misfire detection apparatus.

Moreover, it is possible to prevent misjudgments of combustion or misfiring owing to noise, etc.

While the invention has been described in terms of preferred embodiments, those skilled in the art will recognize that the invention can be practiced with modifications within the spirit and scope of the appended claims.

What is claimed is:

1. A misfire detection apparatus for an internal combustion engine comprising;
   an ionic current detection part for detecting an ionic current flowing between electrodes arranged in a combustion chamber of the internal combustion engine through ions generated upon combustion of an air fuel mixture therein by impressing a voltage on the electrodes;
   a tendency recognition part for recognizing a tendency of a change in the ionic current detected by said ionic current detection part;
   a threshold determination part for setting a threshold for an output of said tendency recognition part; and
   a determination part for determining an occurrence of combustion or misfiring in said combustion chamber based on an output of said tendency recognition part and an output of said threshold determination part.

2. The misfire detection apparatus for an internal combustion engine according to claim 1, wherein said threshold determination part sets the threshold based on a peak of the output of said tendency recognition part.

3. The misfire detection apparatus for an internal combustion engine according to claim 1, wherein said threshold determination part sets the threshold based on a bottom of the output of said tendency recognition part.

4. The misfire detection apparatus for an internal combustion engine according to claim 1, wherein
   said tendency recognition part comprises:

a mask device for masking noise generated upon detection of the ionic current by said ionic current detection part;

a derivative calculation device for calculating a derivative of the ionic current which is detected by said ionic current detection part and masked by said mask device; and a smoothing device for smoothing an output of said derivative calculation device.

5. The misfire detection apparatus for an internal combustion engine according to claim 4, wherein said smoothing device calculates an average value of a predetermined number of consecutive pieces of data calculated by said derivative calculation device and extracts a tendency of a change in the data.

6. The misfire detection apparatus for an internal combustion engine according to claim 5, further comprising a counter device for actuating the processing of each of said derivative calculation device and said smoothing device once or a prescribed number of times.

7. The misfire detection apparatus for an internal combustion engine according to claim 1, wherein said threshold determination part maintains the tendency of the threshold based on the output of said tendency recognition part from the start of setting the threshold until the following point of change in the tendency of the ionic current.

8. The misfire detection apparatus for an internal combustion engine according to claim 1, wherein said threshold determination part maintains the set tendency of the threshold for a predetermined time.

9. The misfire detection apparatus for an internal combustion engine according to claim 8, wherein said threshold determination part stops maintaining the tendency or value of the threshold and sets the threshold in accordance with a shape of the ionic current when the threshold intersects the ionic current even if a set prescribed range has not yet elapsed.

10. The misfire detection apparatus for an internal combustion engine according to claim 1, wherein said threshold determination part offsets the set threshold and sets it as a new threshold.

11. The misfire detection apparatus for an internal combustion engine according to claim 1, wherein said determination part determines an occurrence of combustion or misfiring when the ionic current detected by said ionic current detection part exceeds the threshold set by said threshold determination part for a prescribed range or more.

* * * * *